Patented Sept. 14, 1954

2,689,237

UNITED STATES PATENT OFFICE 2,689,237

RESIN CEMENT AND METHOD FOR MAKING

Raymond B. Seymour, Robert H. Steiner, and Robert Desch, Allentown, Pa., assignors to The Atlas Mineral Products Company of Pennsylvania, Mertztown, Pa., a corporation of Pennsylvania No Drawing. Application May 3, 1952,
Serial No. 286,002

3 Claims. (Cl. 260—33.6)

This invention relates to a resin cement and, more particularly, relates to a resin cement of a thermosetting character having improved properties of adhesion and the method of its preparation.

The commonly used furfuryl alcohol resins have very desirable properties when used for joining ceramic structures, such as, for example, brick and tile. These resins and blends thereof, however, have a marked deficiency in that they have a relatively low order of adhesion.

We have found that the adhesion of the above mentioned resins can be very greatly improved by the addition thereto of a thermoplastic resin in accordance with the teaching of this invention.

It is, therefore, a principal object of this invention to provide resins comprising polyfurfuryl alcohols, furfuryl alcohol-formaldehyde resins or furfuryl alcohol-furfural resins, or blends thereof and which have improved properties of adhesion. All of these resins are well known to the art and are readily available.

The product of this invention will be prepared by taking a liquid polyfurfuryl alcohol resin, furfuryl alcohol-formaldehyde resin or furfuryl alcohol-furfural resin, or a blend thereof, and adding thereto an aromatic hydrocarbon solvent which is miscible with, but not a solvent for, the thermosetting resin selected and which is a solvent for the thermoplastic resin to be added. Exemplary of such solvents are toluene, xylene and benzene.

The thermoplastic component together with the desired filler is then added. The thermoplastic component may be added, if desired, simultaneously with the solvent, but must not be pre-mixed with the solvent before being added to the thermosetting resin.

The thermoplastic resin selected will be in the form of a powder and insoluble in the selected thermosetting resin and soluble in the selected solvent. Exemplary of such resins are polystyrene, its homologues and copolymers, coumarone-indene resin copolymers of vinyl cyclohexene, cyclised rubber, natural and synthetic asphalts.

A filler of, for example, carbon or silica will be mixed with the powdered or comminuted thermoplastic resin before it is added to the thermosetting resin.

After the above described steps have been carried out, our product can be further condensed to form a hard, infusible, resinous product by the addition of a suitable acid having an ionization constant not less than $1.38 \times 10^{-4}$ at 25° C. in a manner well known to the art. Thus, for example, malic acid, formic acid, phthalic acid, paratoluene sulfonic acid, mixtures of sodium acid sulfate and paratoluene sulfonic acid, paratoluene sulfonyl chloride, sulfuric acid and sulfamic acid, sulfamic acid and sodium acid sulfate, or the reaction product of sulfuric acid and ethyl alcohol may be added. The acid can be premixed with the powdered thermoplastic resin and filler.

The thermosetting resin will be present in an amount of from 30 to 125 parts by weight and the solvent in an amount of 0.3 to 15 parts by weight.

The thermoplastic resin will be in an amount of from 0.25 to 7.5 parts by weight. The selected catalyst will be in an amount of 1 to 15 parts by weight. The selected filler will be from 2.0 to 98.75 parts by weight.

The resultant product on condensing to a solid is characterized in that the major portion of the thermoplastic resin is concentrated in the vicinity of the surfaces of the product.

The following examples are illustrative of prior art compounds having inferior adhesion by way of contrast to the products of this invention:

Example 1

A powder was made by mixing 90 parts by weight of carbon with 9 parts by weight of sulfamic acid and 1 part by weight of sodium acid sulfate. This powder was admixed with a liquid polymer of furfuryl alcohol having a viscosity of 100 cps. and a liquid, using a ratio of powder to liquid of 2:1 by weight.

The product thus constituted was used as a mortar between bricks. After three days the adhesion was less than 125 p. s. i.

Example 2

A powder was made by mixing 8 parts by weight of sulfamic acid, 2 parts by weight of paratoluene sulfonic acid and 90 parts by weight of silica. This powder was admixed with a liquid polymer of furfuryl alcohol having a viscosity of 100 cps., using a ratio of powder to liquid of 5:2 by weight.

The product thus constituted was used as a mortar between bricks. After three days the adhesion was less than 100 p. s. i.

The following are exemplary of products of this invention having outstanding properties of adhesion. All of these products have a tensile strength of 300 to 600 p. s. i. Parts by weight in the examples are uniform throughout, being in all cases parts by weight with reference to the completed product.

Example 3

The powder was made by mixing 90 parts by weight of carbon with 9 parts by weight of sulfamic acid and 1 part by weight of sodium acid sulfate. To 100 parts by weight of powder, 0.5 part by weight of powdered coumarone-indene resin having a specific gravity of 1.1 was added. To 100 parts by weight of a liquid polymer of furfuryl alcohol (100 cps.) there was added 0.5 part by weight of toluene. The powder was then added to the liquid resin and the product placed between bricks.

After three days the adhesion to the brick surfaces was sufficiently high to break the bricks. Values ranging from 300–600 p. s. i. were reached in breaking the bricks, depending upon the strength of the brick, without in any case breaking the bond between the cement and the bricks.

Example 4

The powder was made by mixing 90 parts by weight of carbon with 9 parts by weight of sulfamic acid and 1 part by weight of sodium acid sulfate. To 100 parts by weight of powder, 1 part by weight of powdered gilsonite was added. To 100 parts by weight of a liquid polymer of furfuryl alcohol (100 cps.) there was added 1 part by weight of toluene. The powder was then admixed with the liquid resin and the product placed between bricks.

After two days the adhesion to the brick surfaces was sufficiently high to break the bricks. Values ranging from 300–350 p. s. i. were reached in breaking the bricks, depending upon the strength of the brick, without in any case breaking the bond between the cement and the bricks.

Example 5

The powder was made by mixing 90 parts by weight of carbon with 9 parts by weight of sulfamic acid and 1 part by weight of sodium acid sulfate. To 100 parts by weight of powder 7.5 parts by weight of synthetic asphalt having a specific gravity of 1.06 was added. To 100 parts by weight of a liquid polymer of furfuryl alcohol (100 cps.) there was added 0.5 part toluene. The powder was then admixed with the liquid resin and the product placed between bricks.

Example 6

A powder was made using 8 parts by weight of sulfamic acid, 2 parts by weight toluene sulfonic acid, 90 parts by weight silica and 1.5 parts by weight gilsonite (s. g. 1.06). To 100 parts by weight of a liquid furfuryl alcohol-furfural resin (95 cps.) there was added 1 part by weight toluene. The powder was then admixed with the liquid resin and the product placed between bricks.

Example 7

A powder was made by mixing 90 parts by weight of carbon with 9 parts of sulfamic acid by weight and 1 part by weight of sodium acid sulfate. To 100 parts by weight of powder, 3 parts by weight coumarone-indene resin (s. g. 1.1) was added. To 100 parts by weight of a liquid polymer of furfuryl alcohol (100 cps.) there was added 0.5 part by weight toluene. The powder was then admixed with the liquid resin and the product placed between bricks.

Example 8

A powder was made by mixing 90 parts by weight of carbon with 9 parts by weight of sulfamic acid and 1 part by weight of sodium acid sulfate. To 100 parts by weight of powder 5 parts by weight of ground polystyrene (s. g. 1.06) was added. To 100 parts by weight of a liquid polymer of furfuryl alcohol (100 cps.) there was added 5 parts by weight toluene. The powder was then admixed with the liquid resin and the product placed between bricks.

Example 9

The powder was made by mixing 5 parts by weight of carbon with 9 parts by weight of sulfamic acid and 1 part by weight of sodium acid sulfate. To 100 parts by weight of powder, 1 part by weight of powdered gilsonite (s. g. 1.05) was added. To 30 parts by weight of a liquid polymer of furfuryl alcohol (100 cps.) there was added 1 part by weight of toluene. The powder was then admixed with the liquid resin and the product placed between bricks.

After two days the adhesion to the brick surfaces was sufficiently high to break the bricks. Values ranging from 300–350 p. s. i. were reached in breaking the bricks, depending upon the strength of the brick, without in any case breaking the bond between the cement and the bricks.

Example 10

A powder was made by mixing 45 parts by weight of carbon with 9 parts by weight of sulfamic acid and 1 part by weight of sodium acid sulfate. To 100 parts by weight of powder, 5 parts by weight of ground polystyrene (s. g. 1.06) was added. To 50 parts by weight of a liquid polymer of furfuryl alcohol (100 cps.) there was added 5 parts by weight toluene. The powder was then admixed with the liquid resin and the product placed between bricks.

Example 11

The powder was made by mixing 90 parts by weight of carbon with 9 parts by weight of sulfamic acid and 1 part by weight of sodium acid sulfate. To 100 parts by weight of powder, 0.5 part by weight of powdered methyl styrene resin having a specific gravity of 1 was added. To 100 parts by weight of a liquid polymer of furfuryl alcohol-formaldehyde resin (110 cps.) there was added 0.5 part by weight of toluene. The powder was then added to the liquid resin and the product placed between bricks.

After three days the adhesion to the brick surfaces was sufficiently high to break the bricks. Values ranging from 300–600 p. s. i. were reached in breaking the bricks, depending upon the strength of the brick, without in any case breaking the bond between the cement and the bricks.

Example 12

The powder was made by mixing 90 parts by weight of carbon with 9 parts by weight of sulfamic acid and 1 part by weight of sodium acid sulfate. To 100 parts by weight of powder, 1 part by weight of powdered styrene-butadiene resin (s. g. 1) was added. To 100 parts by weight of a liquid polymer of furfuryl alcohol (100 cps.) there was added 1 part by weight of toluene. The powder was then admixed with the liquid resin and the product placed between bricks.

After two days the adhesion to the brick surfaces was sufficiently high to break the bricks. Values ranging from 300–350 p. s. i. were reached in breaking the bricks, depending upon the strength of the brick, without in any case breaking the bond between the cement and the bricks.

Example 13

The powder was made by mixing 90 parts by weight of carbon with 9 parts by weight of sulfamic acid and 1 part by weight of sodium acid sulfate. To 100 parts by weight of powder, 1 part by weight of powdered alphamethylstyrene (specific gravity 1.02) was added. To 100 parts by weight of a liquid polymer of furfuryl alcohol (100 cps.) there was added 1 part by weight of toluene. The powder was then admixed with the liquid and the product placed between bricks.

After two days the adhesion to the brick surfaces was sufficiently high to break the bricks. Values ranging from 300–351 p. s. i. were reached in breaking the bricks, depending upon the strength of the brick, without in any case breaking the bond between the cement and the bricks.

Example 14

The powder was made by mixing 90 parts by weight of carbon with 9 parts by weight of sulfamic acid and 1 part by weight of sodium acid sulfate. To 100 parts by weight of powder 7.5 parts by weight of cyclised rubber having a specific gravity of 1.19 ("Pliolite" sold by Goodyear Tire & Rubber Co.) was added. To 100 parts by weight of a liquid polymer of furfuryl alcohol (100 cps.) there was added 0.5 part toluene. The powder was then admixed with the liquid resin and the product placed between bricks.

Example 15

The powder was made by mixing 90 parts by weight of carbon with 9 parts by weight of sulfamic acid and 1 part by weight of sodium acid sulfate. To 100 parts by weight of powder, 1 part by weight of powdered vinyl cyclohexene resin (s. g. 1.19) was added. To 100 parts by weight of a liquid polymer of furfuryl alcohol (100 cps.) there was added 1 part by weight of toluene. The powder was then admixed with the liquid resin and the product placed between bricks.

After two days the adhesion to the brick surfaces was sufficiently high to break the bricks. Values ranging from 300–350 p. s. i. were reached in breaking the bricks, depending upon the strength of the brick, without in any case breaking the bond between the cement and the bricks.

Example 16

The powder was made by mixing 90 parts by weight of carbon with 9 parts by weight of sulfamic acid and 1 part by weight of sodium acid sulfate. To 100 parts by weight of powder, 0.3 part by weight of powdered coumarone-indene resin (s. g. 1.1) was added. To 30 parts by weight of a liquid polymer of furfuryl alcohol-formaldehyde resin (110 cps.) there was added 0.5 part by weight of toluene. The powder was then added to the liquid resin and the product placed between bricks.

Example 17

The powder was made by mixing 90 parts by weight of carbon with 9 parts by weight of sulfamic acid and 1 part by weight of sodium acid sulfate. To 100 parts by weight of powder, 7 parts by weight of powdered coumarone-indene resin (s. g. 1.1) was added. To 60 parts by weight of a liquid polymer of furfuryl alcohol-formaldehyde resin (110 cps.) there was added 0.5 parts by weight of toluene. The powder was then added to the liquid resin and the product placed between bricks.

It is not desired to be limited except as set forth in the following claims, the above description being by way of illustration only.

What is claimed is:

1. A thermosetting resin cement composition comprising a liquid thermosetting resin selected from the group consisting of a polyfurfuryl alcohol, a furfuryl alcohol-formaldehyde reaction product and a furfuryl alcohol-furfural reaction product and being in an amount of from 30 to 125 parts by weight, a thermoplastic material insoluble in said thermosetting resin and selected from the group consisting of a coumarone-indene resin, vinyl cyclohexene resin, cyclised rubber, a styrene resin and asphalt in an amount of from 0.25 to 7.5 parts by weight, an aromatic hydrocarbon solvent miscible with said thermosetting resin and a solvent for the thermoplastic material, said thermosetting resin being insoluble in said solvent, a filler in an amount of from 2.0 to 98.7 parts by weight and an acid catalyst having an ionization constant not less than $1.38 \times 10^{-4}$ at 25° C. and in an amount of from 1 to 15 parts by weight.

2. A thermosetting resin cement composition comprising a liquid furfuryl alcohol-formaldehyde reaction product in an amount of from 30 to 125 parts by weight, a coumarone-indene resin in an amount of from 0.25 to 7.5 parts by weight, toluene, a filler in an amount of from 2.0 to 98.7 parts by weight and an acid catalyst having an ionization constant not less than $1.38 \times 10^{-4}$ at 25° C. and in an amount of from 1 to 15 parts by weight.

3. Method of preparing a thermosetting resin cement which comprises admixing with a liquid thermosetting resin selected from the group consisting of a polyfurfuryl alcohol, a furfuryl alcohol-formaldehyde reaction product and a furfuryl alcohol-furfural reaction product, which is in an amount of from 30 to 125 parts by weight, an aromatic hydrocarbon solvent miscible with said thermosetting resin and in which the thermosetting resin is insoluble, and admixing with said mixture a thermoplastic material insoluble in said thermosetting resin and selected from the group consisting of a coumarone-indene resin, vinyl cyclohexene resin, cyclised rubber, a styrene resin and asphalt and soluble in the solvent, which is in an amount of from 0.25 to 7.5 parts by weight, a filler in an amount of from 2.0 to 98.7 parts by weight and an acid catalyst having an ionization constant not less than $1.38 \times 10^{-4}$ at 25° C. and in an amount of from 1 to 15 parts by weight.

References Cited in the file of this patent

UNITED STATES PATENTS

| Number | Name | Date |
|---|---|---|
| 2,366,049 | Payne et al. | Dec. 26, 1944 |
| 2,432,623 | Kauth | Dec. 16, 1947 |